3,291,866
(PARA NITRO-3 TERTIARYAMINO-PHENYL)
THIOPHOSPHORIC ACID ESTERS
Karl Mannes and Rudolf Heiss, Cologne-Stammheim, Heinrich Pelster, Leverkusen, and Gunter Unterstenhofer, Opladen, Germany, assignors to Farbenfabriken Bayer Aktiengesellschaft, Leverkusen, Germany, a German corporation
No Drawing. Filed Jan. 20, 1964, Ser. No. 338,564
Claims priority, application Germany, Jan. 22, 1963,
F 38,633
3 Claims. (Cl. 260—945)

The present invention relates to and has as its object novel and useful, insecticidally active phosphorus containing compounds.

More specifically this invention is concerned with phosphoric, phosphonic, phosphinic or thionophosphoric, -phosphonic, -phosphinic acid esters of the general formula

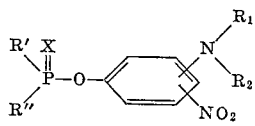

wherein R' and R" denote optionally substituted alkyl, alkenyl, cycloalkyl, aralkyl or aryl radicals which may be linked with the phosphorus atom directly or via an oxygen, sulphur or nitrogen atom, and R' and R" also represent amino groups, whilst X is an oxygen or sulfur atom and $R_1$ and $R_2$ stand for hydrogen or preferably lower alkyl or alkenyl radicals or, together with the nitrogen atom, form a 5- or 6-membered heterocyclic ring system which may be interrupted by further hetero atoms such as oxygen, sulphur or nitrogen.

In accordance with the present invention it has been found that compounds which are highly effective insecticides are obtained by reacting (thiono)phosphoric(phosphonic, phosphinic) acid halides of the general formula

with nitrosubstituted aminophenols of the formula

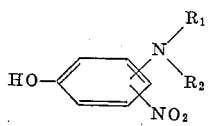

whereby products of the general structure as given above are formed.

In the last-mentioned formulae, the radicals R', R", $R_1$, $R_2$ and X have the same meaning as indicated above, whilst Hal denotes a halogen atom.

The symbols R' and R" preferably stand for methyl, ethyl, chloromethyl, isopropyl, isobutyl, isobutenyl, isooctenyl, ethylmercaptovinyl, cyclohexyl, benzyl, phenyl, chlorophenyl, tolyl, anisyl, thioanisyl radicals, furthermore for methoxy, ethoxy, isopropoxy, chloroethoxy, methylmercapto, ethylmercapto, isopropylmercapto, butylmercapto and chloroethylmercapto radicals as well as for mono- or dimethyl-(-ethyl-, -allyl-, -cyclohexyl-)-amino groups. Besides hydrogen, $R_1$ and $R_2$ preferably denote methyl, ethyl or allyl radicals, or, together with the nitrogen atom, form a morpholine, thiomorpholine, pyrrolidine or piperidine ring.

The reaction according to the process of the invention is preferably carried out in the presence of inert organic solvents. Most suitable are lower aliphatic alcohols, ketones and nitriles, such as methanol, ethanol, isopropanol, acetone, methyl ethyl ketone, methyl isopropyl ketone, methyl isobutyl ketone, acetonitrile and propionitrile, but also aliphatic or aromatic, optionally chlorinated hydrocarbons, e.g. methylene chloride, chloroform, carbon tetrachloride, benzene, chlorobenzene, toluene, xylene, as well as dimethyl formamide.

Furthermore, the production of the compounds according to the invention is preferably carried out in the presence of acid-binding agents, alkali metal carbonates and alcoholates as well as tertiary aliphatic or aromatic amines having proved especially suitable for this purpose. Instead of working in the presence of acid acceptors, it is also possible to produce first the salts, preferably alkali metal or ammonium salts, of the above-mentioned nitrosubstituted aminophenols in substance, and to react them subsequently according to the present invention. On the other hand, it is also possible to start from the hydrohalides of the said phenols, provided that twice the theoretically necessary amount of acid-binding agents is used.

The reaction according to the inventive process proceeds already at room temperature, but it is advantageously carried out at a slightly to moderately elevated temperatures (40 to 100° C.), in order to attain good yields and pure products.

The nitro-substituted aminophenols required as starting materials for the process according to the invention, e.g. 3-N,N-dimethylamino-4-nitro-, 3-pyrrolidino-4-nitro- and 3-N,N-dimethylamino-2-nitrophenol can be obtained by reacting 3-chloro-4-nitro- or 3-chloro-2-nitrophenol with an aqueous, aqueous-alcoholic or alcoholic solution of a nitrogen-containing base of the formula

in which $R_1$ and $R_2$ have the significance given above at temperatures between 50 and 150° C. and recovering the nitro-substituted aminophenol thus formed from the reaction mixture.

The phosphoric, phosphonic, phosphinic or thionophosphoric, -phosphonic, -phosphinic acid esters obtainable according to the present invention are mostly viscous, yellow to brown oils which cannot be distilled without decomposition, even under strongly reduced pressure. On account of their outstanding insecticidal effectiveness, especially their extraordinarily wide range of activity, the products are used as pest control agents, particularly for plant protection.

The new compounds of the present invention very effectively kill insects like aphids, spider mites, caterpillars, beetles, flies, ticks etc. They distinguish themselves especially by a good contact-insecticidal activity and mostly also by a systemic and ovicidal action. At the same time they have an activity on eating insects such as caterpillars. Most surprisingly they are of remarkably low toxicity against warm-blooded animals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae I) 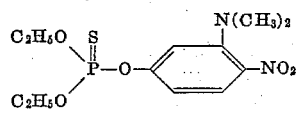

II) 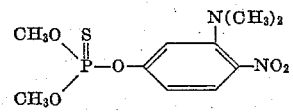

have been tested against aphids (compound II), spider mites, and caterpillars. Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs. The tests have been carried out as follows:

(a) Against aphids (species *Doralis fabae*): Heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (II) | 0.1 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.001 | 80 |
| (II) | 0.01 | 100 |

(c) Against caterpillars of the type diamond black moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| (I) | 0.01 | 100 |
| (II) | 0.01 | 100 |

The following examples illustrate the invention:

*Example 1*

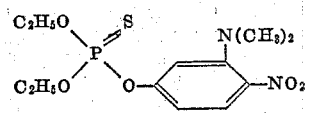

21.85 g. (0.1 mol) of 3-N,N-dimethylamino-4-nitrophenol hydrochloride are heated together with 30.4 g. (0.22 mol) of potassium carbonate in 150 ml. of anhydrous methyl ethyl ketone at 50 to 60° C. for one hour. 18.6 g. (0.11 mol) of O,O-diethyl-thionophosphoric acid chloride are subsequently added dropwise at 50° C. to the reaction mixture, which is further stirred at 60 to 70° C. for one hour. After the mixture has cooled to room temperature, the precipitated salts are filtered off with suction, washed with methyl ethyl ketone and the combined filtrates are poured into water. The oil which precipitates is taken up in benzene, the organic layer is separated and washed with water until its reaction is neutral. After drying the benzene solution over sodium sulphate, the solvent is distilled off in a vacuum. There remain 27 g., corresponding to 81.6% of the theoretical, of the O,O-diethylthio-phosphoric acid-O-(3-N,N-dimethylamino-4-nitro-phenyl)ester in the form of a brown oil.

*Analysis.*—Calculated: P, 9.3%; S, 9.6%; N, 8.4%. Found: P, 9.5%; S, 9.6%; N, 8.3%.

Caterpillars are destroyed by 0.01% solutions of the compound to 100%, spider mites up to 80% even by 0.001% solutions. The product also has an ovicidal effect against the eggs of spider mites.

The 3-N,N-dimethylamino-4-nitrophenol to be used as starting material is prepared in accordance with the general statements given above in the following way:

A mixture of 173.6 g. (1 mol) of 3-chloro-4-nitrophenol, 300 ml. of ethanol and 500 ml. of a 4% aqueous solution of dimethylamine are heated at 90 to 100° C. in a 3 litre autoclave equipped with a stirring apparatus for 5 hours. Then the ethanol is distilled off in a vacuum and the red oil formed is separated from the water in a separatory funnel. The 3-N,N-dimethylamino-4-nitrophenol is dissolved in 300 ml. of ethanol and precipitated with about 100 ml. of concentrated hydrochloric acid. The hydrochloride is filtered off with suction and dried in air. The yield amounts to 170 g. (78% of the theoretical) of yellowish crystals with the decomposition point of 174° C. The potentiometric titration with sodium hydroxide solution shows that the product possesses a purity of 98%. The free base may be produced from the hydrochloride in the usual way by neutralisation with sodium hydroxide solution. From benzene the product crystallises in the form of light red crystals of M.P. 102 to 104° C.

*Analysis.*—$C_8H_{10}N_2O_3$ (molecular weight 182.2).— Calc.: C, 52.74%; H, 5.53%; O, 26.35%; N, 15.38%. Found: C, 52.12%; H, 5.56%; O, 26.14%; N, 15.41%.

*Example 2*

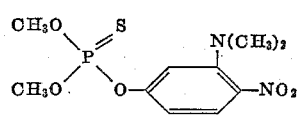

21.85 g. of 3-N,N-dimethylamino-4-nitrophenol hydrochloride are reacted with 17.6 g. of O,O-dimethyl-thionophosphoric acid chloride in the same manner as described in Example 1. After working up the mixture, 25 g., corresponding to 81.7% of the theoretical, of O,O-dimethyl-thionophosphoric acid - O-(3-N,N-dimethylamino-4-nitrophenyl)ester are obtained in the form of a brown oil.

*Analysis.*—Calculated: P, 10.1%; S, 10.5%; N, 9.15%. Found: P, 10.3%; S, 10.7%; N, 9.3%.

Aphids are killed to 100% by 0.1% solutions of the compound, spider mites and caterpillars even by 0.01% solutions. When applied at a concentration of 0.1%, the product has a 100% systemic action.

The following compounds are obtained in an analogous manner:

| Constitution | Yield (percent of the theoretical) |
|---|---|
| 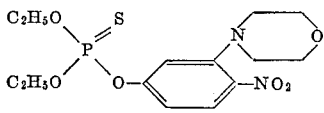 C₂H₅, P(=S), C₂H₅, O—⟨benzene⟩—N(CH₃)₂, NO₂ | 73 |
| (CH₃)₂N, P(=O), (CH₃)₂N, O—⟨benzene⟩—N(CH₃)₂, NO₂ | 63 |
| C₂H₅O, P(=S), CH₃, O—⟨benzene⟩—N(CH₃)₂, NO₂ | 82 |
| C₂H₅O, P(=O), C₂H₅O, O—⟨benzene⟩—N(CH₃)₂, NO₂ | 91 |
| i-C₃H₇O, P(=S), i-C₃H₇O, O—⟨benzene⟩—N(CH₃)₂, NO₂ | 81.5 |

*Example 3*

C₂H₅O, P(=S), C₂H₅O, O—⟨benzene⟩—N(morpholine)O, NO₂

22.4 g. of 3-morpholyl-4-nitrophenol are reacted in the presence of 15.2 g. of potassium carbonate with 19.8 g. of O,O-diethyl-thionophosphoric acid chloride as indicated in Example 1. After working up the mixture in the manner described, 32 g., corresponding to 85% of the theoretical, of O,O-diethyl-thionophosphoric acid-O-(3-morpholyl-4-nitrophenyl) ester are obtained in the form of a brown oil.

*Analysis.*—Calculated: N, 7.45%; P, 8.25%. Found: N, 7.49%; P, 8.5%.

The following compounds are obtained by the same method:

| Constitution | Yield (in percent of the theoretical) |
|---|---|
| (CH₃O)₂P(=S)—O—⟨benzene⟩—(morpholine), NO₂ | 66 |
| [(CH₃)₂N—]₂P(=O)—O—⟨benzene⟩—(morpholine), NO₂ | 75.5 |
| (C₂H₅O)₂P(=O)—O—⟨benzene⟩—(morpholine), NO₂ | 91.5 |
| CH₃—P(=S)(OC₂H₅)—O—⟨benzene⟩—(morpholine), NO₂ | 89.5 |
| (i-C₃H₇O)₂P(=S)—O—⟨benzene⟩—(morpholine), NO₂ | 81.7 |

*Example 4*

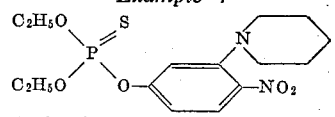
C₂H₅O, P(=S), C₂H₅O, O—⟨benzene⟩—(piperidine), NO₂

23.5 g. of 3-piperidyl-4-nitrophenol hydrochloride are reacted, as described in Example 1 in the presence of 10.4 g. of potassium carbonate with 21.1 g. of O,O-diethylthiono-phosphoric acid chloride. After working up the reaction mixture, 82 g., corresponding to 85% of the theoretical, of O,O-diethyl-thionophosphoric acid-O-(3-piperidyl-4-nitrophen-yl) ester are obtained in the form of a brown oil.

The following compounds can be obtained in an analogous manner:

| Constitution | Yield (in percent of the theoretical) |
|---|---|
| (Cl—CH₂—CH₂O)₂P(=O)—O—⟨benzene⟩—(piperidine), NO₂ | 54 |
| (CH₃O)₂P(=S)—O—⟨benzene⟩—(piperidine), NO₂ | 43.4 |
| (C₂H₅)₂P(=S)—O—⟨benzene⟩—(piperidine), NO₂ | 79 |
| (C₂H₅O)₂P(=S)—O—⟨benzene⟩—(pyrrolidine), NO₂ | ¹ 85.5 |
| (C₂H₅O)₂P(=S)—O—⟨benzene⟩—N(CH₃)₂, O₂N | 54.0 |

¹ M.P., 52 to 54° C.

The 3-piperidyl-4-nitrophenol to be used as starting material is prepared in accordance with the general statements in the following way:

A mixture of 624 g. (3.6 mol) of 3-chloro-4-nitrophenol, 1.022 g. (10 mol) of piperidine and 1.200 ml. of ethanol are heated at 90 to 100° C. in a 5 litre autoclave equipped with a stirring apparatus for 20 hours. After cooling of the mixture the precipitated piperidinium hydrochloride is filtered off and the filtrate is acidified with concentrated hydrochloride acid. A mixture of the hydrochlorides of 3-piperidyl-4-nitrophenol and the excess of piperidine separates and is filtered off with suction. The mixture of the hydrochlorides is dissolved in 10 litres of water with heating and the solution is neutralised with sodium hydroxide solution until it has a pH of 5 to 6. The 3-piperidyl-4-nitrophenol precipitates in an oily form and crystallises after cooling as orange-red crystals of M.P. 90 to 91° C.

The yield amounts to 611 g. (77% of the theoretical).

*Analysis.*—C₁₁H₁₄N₂O₃ (molecular weight 222.2)— Calculated: C, 59.45%; H, 6.35%; O, 21.60%; N, 12.60%. Found: C, 59.53%; H, 6.40%; O, 21.55%; N, 12.59%.

The 3-morpholyl-4-nitrophenol is obtained in an analogous manner by reacting 624 g. (3.6 mol) of 3-chloro-4-nitrophenol and 1.045 g. (12 mol) of morpoholine in 1.200 ml. of ethanol. The compound is obtained in the form of yellow crystals of M.P. 194 to 195.5° C. The yield amounts to 645 g. (80% of the theoretical).

*Analysis.*—C$_{10}$H$_{12}$N$_2$O$_4$ (molecular weight 224.2)—Calculated: C, 53.57%; H, 5.39%; O, 28.54%; N, 12.50%. Found: C, 53.55%; H, 5.70%; O, 28.92%; N, 12.39%. Molecular weight: 223.

Example 5

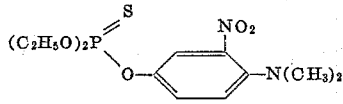

21.85 g. (0.1 mol) of 3-nitro-4-N,N-dimethylaminophenol hydrochloride and 21.1 g. (0.105 mol) of O,O-diethylthionophosphoric acid chloride are reacted in the presence of 30.4 g. (0.11 mol) of potassium carbonate in 100 ml. of methylethylketone as already described in Example 1. After working up of the mixture there are obtained 20 g. corresponding to 60% of the theoretical of the O,O-diethyl-thionophosphoric acid-O-(3-nitro-4-N,N-dimethylaminophenyl)-ester in the form of a brown oil. *Analysis.*—N—Calc.: 8.38%. N—Found: 8.46%.

Caterpillars are destroyed by 0.1% solutions of the compound to 90%, flies (Drosophila) even to 100%.

In an analogous manner there are obtained the following compounds:

We claim:
1. The compound of the formula

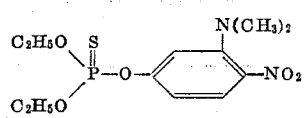

2. The compound of the formula

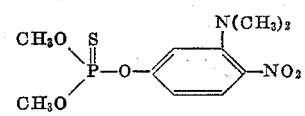

3. A compound of the formula

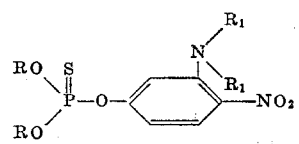

wherein R and R$_1$ stand for lower alkyl having up to 4 carbon atoms.

| Constitution | Yield in percent of the theoretical | Analysis: N Calc. (percent) | Found (percent) |
|---|---|---|---|
| CH$_3$O)$_2$P(S)-O-C$_6$H$_3$(NO$_2$)-N(CH$_3$)$_2$ | 52.3 | 7.15 | 9.42 |
| C$_2$H$_5$O)$_2$P(S)-O-C$_6$H$_3$(NO$_2$)-N(morpholino) | 95.6 | 7.44 | 7.31 |
| CH$_3$O)$_2$P(S)-O-C$_6$H$_3$(NO$_2$)-N(morpholino) | 86.2 | 8.05 | 7.95 |
| C$_2$H$_5$O)$_2$P(O)-O-C$_6$H$_3$(NO$_2$)-N(piperidino) | 95.0 | 7.83 | 8.02 |
| C$_2$H$_5$O)$_2$P(S)-O-C$_6$H$_3$(NO$_2$)-N(piperidino) | 88.2 | 8.60 | 8.90 |
| CH$_3$-P(S)(OC$_2$H$_5$)-O-C$_6$H$_3$(NO$_2$)-N(piperidino) | 96.0 | 8.15 | 8.03 |

References Cited by the Examiner

UNITED STATES PATENTS

| | | | |
|---|---|---|---|
| 2,307,704 | 1/1943 | Moore | 167—30 |
| 2,307,705 | 1/1943 | Moore | 167—30 |
| 3,100,790 | 8/1963 | Oertel et al. | 260—944 |
| 3,180,873 | 4/1965 | Schmidt et al. | 260—945 |

FOREIGN PATENTS 681,102  10/1962  Great Britain.

OTHER REFERENCES

Hazelton, Agri. & Food Chem., vol. 3, No. 4, page 312 (April 1955).

ALEX MAZEL, *Primary Examiner.*

HENRY R. JILES, *Examiner.*

J. TOVAR, *Assistant Examiner.*